(12) United States Patent
Jayasinghe Laddu et al.

(10) Patent No.: US 12,294,551 B2
(45) Date of Patent: May 6, 2025

(54) NR FRAMEWORK FOR BEAM PREDICTION IN SPATIAL DOMAIN

(71) Applicant: Nokia Technologies Oy, Espoo (FI)

(72) Inventors: Keeth Saliya Jayasinghe Laddu, Espoo (FI); Qiping Zhu, Wheaton, IL (US); Andrea Bonfante, Palaiseau (FR)

(73) Assignee: Nokia Technologies Oy, Espoo (FI)

( * ) Notice: Subject to any disclaimer, the term of this patent is extended or adjusted under 35 U.S.C. 154(b) by 402 days.

(21) Appl. No.: 17/731,152

(22) Filed: Apr. 27, 2022

(65) Prior Publication Data
US 2023/0353326 A1    Nov. 2, 2023

(51) Int. Cl.
*H04L 5/00*    (2006.01)

(52) U.S. Cl.
CPC ............ *H04L 5/006* (2013.01); *H04L 5/0048* (2013.01); *H04L 5/0053* (2013.01)

(58) Field of Classification Search
CPC ..... H04L 5/006; H04L 5/0048; H04L 5/0053; H04L 25/0254; H04B 7/06952; H04B 7/088; H04B 7/0658
USPC ...................................................... 455/452.1
See application file for complete search history.

(56) References Cited

U.S. PATENT DOCUMENTS

| | | | |
|---|---|---|---|
| 10,917,159 B2* | 2/2021 | Gao | H04B 7/0695 |
| 11,405,091 B2* | 8/2022 | Rune | H04B 7/04 |
| 12,010,542 B2* | 6/2024 | Matsumura | H04W 16/28 |
| 2020/0136705 A1* | 4/2020 | Li | H04B 7/0626 |
| 2021/0067297 A1 | 3/2021 | Farmanbar et al. | |
| 2021/0351885 A1 | 11/2021 | Chavva et al. | |
| 2022/0361195 A1* | 11/2022 | Sun | H04L 5/0057 |
| 2023/0422071 A1* | 12/2023 | Ramachandra | H04W 24/10 |
| 2024/0236724 A1* | 7/2024 | Sun | H04L 5/0035 |

OTHER PUBLICATIONS

3rd Generation Partnership Project; Technical Specification Group Radio Access Network; NR; Physical layer procedures for control (Release 17), 258 pages, 3GPP TS.38.213 v17.4.0.

(Continued)

*Primary Examiner* — Don N Vo
(74) *Attorney, Agent, or Firm* — Mintz Levin Cohn Ferris Glovsky and Popeo, P.C.

(57) ABSTRACT

In some example embodiments, there may be provided a method that includes receiving, by a user equipment, at least a reporting configuration from a network, wherein the reporting configuration is associated with at least a first group of channel measurement resources to be measured by the user equipment and a second group of channel measurement resources for which beam indexes or beam measurements are predicted by a machine learning model comprised at the user equipment; providing, as an input to the machine learning model comprised at the user equipment, at least a first set of measurements on the first group of channel measurement resources; and reporting, to the network, channel measurement information, wherein the channel measurement information contains at least an index representing a channel measurement resource of the second group of channel measurement resources. Related systems, methods, and articles of manufacture are also disclosed.

20 Claims, 13 Drawing Sheets

(56) References Cited

OTHER PUBLICATIONS

3rd Generation Partnership Project; Technical Specification Group Radio Access Network; NR; Radio Resource Control (RCC) protocol specification (Release 15), 531 pages, 3GPP TS.38.331 v15.20.1.

Chou, T.-H., et al. "Fast Position-Aided MIMO Beam Training via Noisy Tensor Completion." IEEE Journal of Selected Topics in Signal Processing 15.3 (2021).

Jagatap, G. et al. "Sample-Efficient Algorithms for Recovering Structured Signals from Magnitude-Only Measurements." IEEE transactions on information theory (2019).

TCL Communication Ltd., "Views on Artificial Intelligence & Machine Learning Application in Rel-18," 3rd Generation Partnership Project (3GPP) TSG RAN Meeting #94-e, RP-213007, Electronic Meeting, Sep. 6-17, 2021, 2 pages.

International Search Report and the Written Opinion issued in PCT/EP2023/055108, mailed Jun. 14, 2023, in co-pending Patent Cooperation Treaty Application, 18 pages.

\* cited by examiner

Option 1

Option 2

Option 3

Option 4

Option 5

Option 6

NR FRAMEWORK FOR BEAM PREDICTION IN SPATIAL DOMAIN

FIELD

The subject matter described herein relates to wireless communications.

BACKGROUND

With the 5th generation (5G) of mobile communication, the network is being driven with respect to latency, throughput, and spectral efficiency. With the advent of the 6th generation (6G) and beyond, the network may be pushed even further, so there is a need to facilitate gains in network performance.

SUMMARY

In some example embodiments, there may be provided a method that includes receiving, by a user equipment, at least a reporting configuration from a network, wherein the reporting configuration is associated with at least a first group of channel measurement resources to be measured by the user equipment and a second group of channel measurement resources for which beam indexes or beam measurements are predicted by a machine learning model comprised at the user equipment; providing, as an input to the machine learning model comprised at the user equipment, at least a first set of measurements on the first group of channel measurement resources; and reporting, to the network, channel measurement information, wherein the channel measurement information contains at least an index representing a channel measurement resource of the second group of channel measurement resources that are predicted by the machine learning model comprised at the user equipment.

In some variations, one or more of the features disclosed herein including the following features can optionally be included in any feasible combination. The index is determined by considering a joint indexing of the first group of channel measurement resources measured by the user equipment and the second group of channel measurement resources predicted by the machine learning model. The index is determined by considering indexing of the second group of channel measurement resources for which beam indexes or beam measurements are predicted by the machine learning model. A single resource configuration containing channel measurement resources is mapped to the reporting configuration, wherein the first group of channel measurement resources to be measured by the user equipment is defined as a sub-set of channel measurement resources in the single resource configuration, wherein a remaining portion of channel measurement resources are determined as the second group of channel measurement resources for which beam indexes or beam measurements are predicted by the machine learning model. A first resource configuration and a second resource configuration each contain at least channel measurement resources that are mapped to the reporting configuration comprised as a single reporting configuration, wherein the first resource configuration is determined as the first group of channel measurement resources to be measured by the user equipment, and wherein the second resource configuration is determined as the second group of channel measurement resources for which beam indexes or beam measurements are predicted by the machine learning model. The reporting configuration is associated to an another reporting configuration, wherein the reporting configuration is linked to the other reporting configuration, such that each of the reporting configuration and the other reporting configuration is mapped to a corresponding one of the first group of channel measurement resources or the second group of channel measurement resources. The reporting configuration defines either the first group of channel measurement resources or the second group of channel measurement resources, wherein the method further comprises: receiving an indication by a dynamic signaling from the network, wherein the indication provides the other of the two channel measurement resource groups not defined by the reporting configuration; and applying the indicated other of the two channel measurement resource groups resource group as a remaining resource group that is associated with the reporting configuration. The reporting configuration configures the first group of channel measurement resources and the second group of channel measurement resources, wherein the method further comprises: receiving an indication by a dynamic signaling from the network, wherein the indication provides at least an update to the first group and/or the second group; and updating the indicated resource group as the first or second resource group for the reporting configuration. The reporting configuration is associated with a resource configuration including the first group of channel measurement resources to be measured by the user equipment, and wherein the second group of channel measurement resources, for which beam indexes or beam measurements are predicted by the machine learning model, is derived based on a rule. The reporting configuration is associated with a resource configuration including the second group of channel measurement resources for which beam indexes or beam measurements are predicted by the machine learning model, and wherein the first group of channel measurement resources to be measured by the user equipment is derived based on a rule.

In some example embodiments, there may be provided a method that includes sending, to a user equipment, at least a reporting configuration, wherein the reporting configuration is associated with at least a first group of channel measurement resources to be measured by the user equipment and a second group of channel measurement resources for which beam indexes or beam measurements are predicted by a machine learning model comprised at the user equipment; sending, to the user equipment, a message to cause the user equipment to initiate channel state information reporting; and in response to the sending of the message, receiving channel measurement reporting containing at least an index representing a channel measurement resource of the second group of channel measurement resources that are predicted by the machine learning model comprised at the user equipment.

In some variations, one or more of the features disclosed herein including the following features can optionally be included in any feasible combination. The index is determined by considering a joint indexing of the first group of channel measurement resources measured by the user equipment and the second group of channel measurement resources predicted by the machine learning model. The index is determined by considering indexing of the second group of channel measurement resources for which beam indexes or beam measurements are predicted by the machine learning model. A single resource configuration containing channel measurement resources is mapped to the reporting configuration, wherein the first group of channel measurement resources to be measured by the user equipment is defined as a sub-set of channel measurement resources in the single resource configuration, wherein a remaining portion of channel measurement resources are determined as the second group of channel measurement resources for which beam indexes or beam measurements are predicted by the machine learning model. A first resource configuration and a second resource configuration each contain at least channel measurement resources that are mapped to the reporting configuration comprised as a single reporting configuration, wherein the first resource configuration is determined as the first group of channel measurement resources to be measured by the user equipment, and wherein the second resource configuration is determined as the second group of channel measurement resources for which beam indexes or beam measurements are predicted by the machine learning model. The reporting configuration is associated to an another reporting configuration, wherein the reporting configuration is linked to the other reporting configuration, such that each of the reporting configuration and the other reporting configuration is mapped to a corresponding one of the first group of channel measurement resources or the second group of channel measurement resources. The reporting configuration defines either the first group of channel measurement resources or the second group of channel measurement resources, wherein the method further comprises: sending an indication by a dynamic signaling to the user equipment, wherein the indication provides the other of the two channel measurement resource groups not defined by the reporting configuration. The reporting configuration configures the first group of channel measurement resources and the second group of channel measurement resources, wherein the method further comprises: sending an indication by a dynamic signaling to the user equipment, wherein the indication provides at least an update to the first group and/or the second group. The reporting configuration is associated with a resource configuration including the first group of channel measurement resources to be measured by the user equipment, and wherein the second group of channel measurement resources, for which beam indexes or beam measurements are predicted by the machine learning model, is derived based on a rule. The reporting configuration is associated with a resource configuration including the second group of channel measurement resources for which beam indexes or beam measurements are predicted by the machine learning model, and wherein the first group of channel measurement resources to be measured by the user equipment is derived based on a rule.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
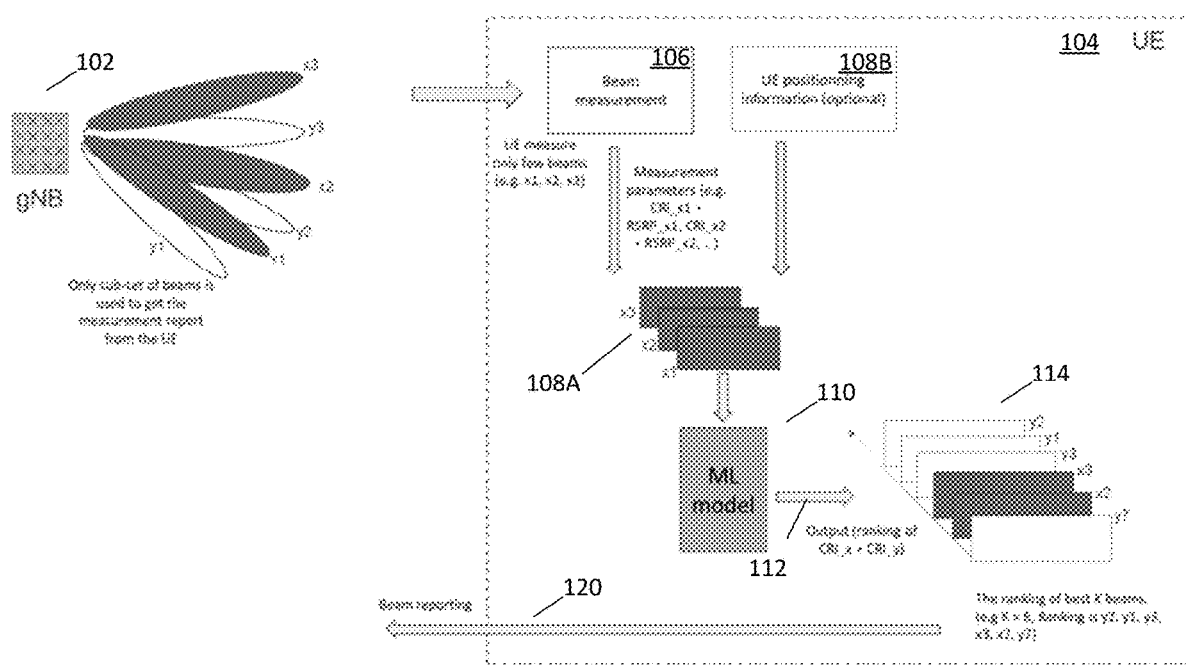
FIG. 1 depicts an example of machine learning (ML) based beam prediction in the spatial domain that predicts a ranking of best beams, in accordance with some example embodiments.

Like labels are used to refer to same or similar items in the drawings.

DETAILED DESCRIPTION

With the advent 5G and beyond, machine learning (ML) or artificial intelligence (AI) at the user equipment may be used to predict channel state information for a first group of channel measurement resources, such that the prediction is based on actual channel state information measurements of a second group of channel measurement resources. In this way, the user equipment may report to the network the K best beams considering the actual and ML/AI predicted channel state information measurements. However, there issues related to how the UE is to be informed of which resources are to be predicted and which are to be measured as well as what the content of the measurement reporting back to the network in the case of such predictions. Disclosed herein is a framework to support in NR the use of such predictions.

Before providing additional details regarding the framework for beam prediction, the following provides some context regarding beam prediction and machine learning by the UE to predict beams in the Third Generation Partnership Project (3GPP).

As of Release 15 of 3GPP, 3GPP has standardized a set of operations for the support of beamforming transmission. These operations include beam sweeping, beam measurements and reporting, and beam maintenance and recovery, and aspects of these operations are described in the 3GPP standard under the topic of beam management procedures (see, e.g., 3GPP TS 38.214, 3GPP TS 38.321, and 3GPP TS 38.331). Beam management has evolved in in subsequent releases 16 and 17 to support more advanced configurations, such as multi-beam reporting, multiple transmission reception points (TRPs), and multi-panel configurations.

However, a problem of the beam management procedures is that with a larger number of beams supported by higher dimensional multiple input multiple output (MIMO) arrays, the channel state (or status) information reference signal (CSI-RS) measurements and the feedback overhead increase to enable beam selection. In addition, the time required for the New Radio (NR, also referred to 5G) base station (e.g., a gNB) and a user equipment (UE) to complete beam sweeping and establish a best beam increases accordingly—limiting thus support of low latency communication. This is due in part to the frequency of synchronization signal block (SSB) and/or CSI-RS transmission during, for example, the P1, P2, P3 procedures that are described in 3GPP TR 38.802, Study on New Radio Access Technology Physical Layer Aspects (Release 14), 2017-09).

The P1, P2, P3 procedures can be summarized as follows. In the P1 procedure, beam sweeping is implemented for the gNB to scan a coverage area periodically transmitting synchronization signal blocks (SSBs) with wide angular beams. Conversely, the UE scans different synchronization signal blocks to identify the best beam and corresponding time and/or frequency resources on which to request access. In the P2 procedure, the gNB performs beam refinement transmitting channel state (or status) information reference signals (CSI-RSs) with narrow beams to identify a more precise direction towards the UE after establishing the wide beam in P1. In the P3 procedure, beam refinement is implemented at the UE side to scan a set of receive (Rx) narrow beams while the gNB transmits CSI-RSs using the best beam identified in the P2 procedures. The procedures P1, P2 and P3, are executed sequentially to establish the data transmission between gNB and UE, and in case of beam failure and recovery are fully repeated. In addition, P2 and P3 are also periodically repeated for beam maintenance.

A reason for supporting machine learning (ML) (and/or artificial intelligence (AI)) based beam management is the savings with respect to overhead reduction and/or latency reduction. ML algorithms may predict a serving beam for one or more different UE locations and one or more time instances, which may enable avoiding measuring the actual beam quality and saving those resources to be employed for data transmission. But beam scanning operations like those performed in P1, P2 and P3 are time inefficient and not scalable when the size of antenna arrays increases. As such, ML algorithms may be used to replace sequential beam scanning, such that the ML algorithms predict a recommended, reduced set of beams likely to contain the best beam index of a full scan.

The use cases for AI/ML-based beam management indicated in RP-213599 (titled "Study on Artificial Intelligence (AI)/Machine Learning (ML) for NR Air Interface, Dec. 6-17, 2021) are beam prediction in time and/or spatial domain as well as beam selection accuracy improvement. Beam prediction in time refers to a broad range of ML approaches that predict the next beam to use, so beam prediction predicts a best beam to use in successive time instances, while spatial domain ML approaches infer a best beam in different spatial locations. And, the ML approaches considering improving beam selection accuracy look to system performance aspects (e.g., reliability and outage) that target specific applications.

FIG. 1 depicts ML based beam prediction in the spatial domain that predicts a ranking of best beams at the UE, in accordance with some example embodiments. The terms "AI" and "ML" are used herein interchangeably. FIG. 1 shows a gNB base station 102 and a UE 104, which includes a machine learning model 110. The machine learning model 110 may comprise circuitry, such as an AI or ML engine on a processor. In the example of FIG. 1, the UE may measure a subset of narrow beam measurements at different spatial locations (see, e.g., narrow beams labeled x1-x3 in the example of FIG. 1) and then use these measurements to predict the best narrow beams (considering a larger set of spatial locations) at the UE side—avoiding measurements of the narrow beams labeled y1-y3 in the example of FIG. 1. In other words, the ranking of the beams may be based on actual measurements of beams x1-x3 and the predicted measurements/performance (using the ML model 110) of beams y1-y3.

To illustrate further, the gNB 102 may configure the UE 104 to measurement report only a given subset of beams, which in this example is the beams marked x1, x2 and x3 but the other beams y1, y2 and y3 are excluded from the set of actual UE measurements. In this example, the UE 102 may include the ML model 110. This ML model may be a ML beam prediction model, such as a neural network beam prediction model and/or other types of ML model. Using the ML model 110, the UE measures only a subset of the beams at 106 (which in this example is beams x1, x2 and x3) and determines (e.g., computes, etc.) values, such as CRI (e.g., CSI-RS Resource Indicator), reference signal received power (RSRP), and/or other parameters, to be used as input data of the ML model. In the example of FIG. 1, the measurement parameters (e.g., CRI and RSRP) for each of the measured beams x1-x3 are provided as an input at 108A to the ML model 110. The ML model may also receive as an input positioning information 108B extracted from UE device sensors (if available, for example) as well as other information (e.g., an indicator of the identity of the other resources which are to be predicted, such as y1-y3).

In the example of FIG. 1, the UE 104 executes the ML model 110 prediction locally at the UE, and the ML model 110 provides at 112 a list of CRI associated with K beams. The list of CRI values for the beams x1-x3 and the predicted y1-y3 may be ranked (e.g., in ascending or descending order). As shown in the small plot 114, the CRI list includes a ranking of the K best beams, where K is 6 beams in this example. The CRI ranking of the K best beams includes both the measured subset of beams (e.g., solid filled x2 and x3) and predicted beams (empty filled y7, y3, y1, and y2) which were not measured by the UE but predicted by the ML model 110). In the example of FIG. 1, the ranking is in descending order from the most likely best beam to the less likely best beam, although the best beams may be identified and/or ranked in other ways as well. The list of ranked beams and available measurement values (e.g., RSRP values) for the K best beams (e.g., beams y7, x2, x3, y3, y1, and y2) are added to a beam reporting message, which the UE 104 sends at 120 to the gNB. For example, the UE may report a beam index along with the corresponding CRI, so in the case of K is 6 best beams being reported to the gNB, the UE may rank the beams in descending order (e.g., best to worse), such as CRI_y2, CRI_y1, CRI_y3, CRI_x3, CRI_x2, CRI_y7.

In the example of FIG. 1, the ML model 110 is trained to provide the output 112 given the input data 108A (which may optionally include 108B as noted above as well as other information). ML-based technology may be robust enough to catch the correlation structure and relationship between different beam measurements among the training data. After training, the ML model can be used as a nonlinear interpolator to recover (e.g., by predicting or inferring) the unmeasured beams given a limited set of measured beams as input of the ML model.

Figure 2A:
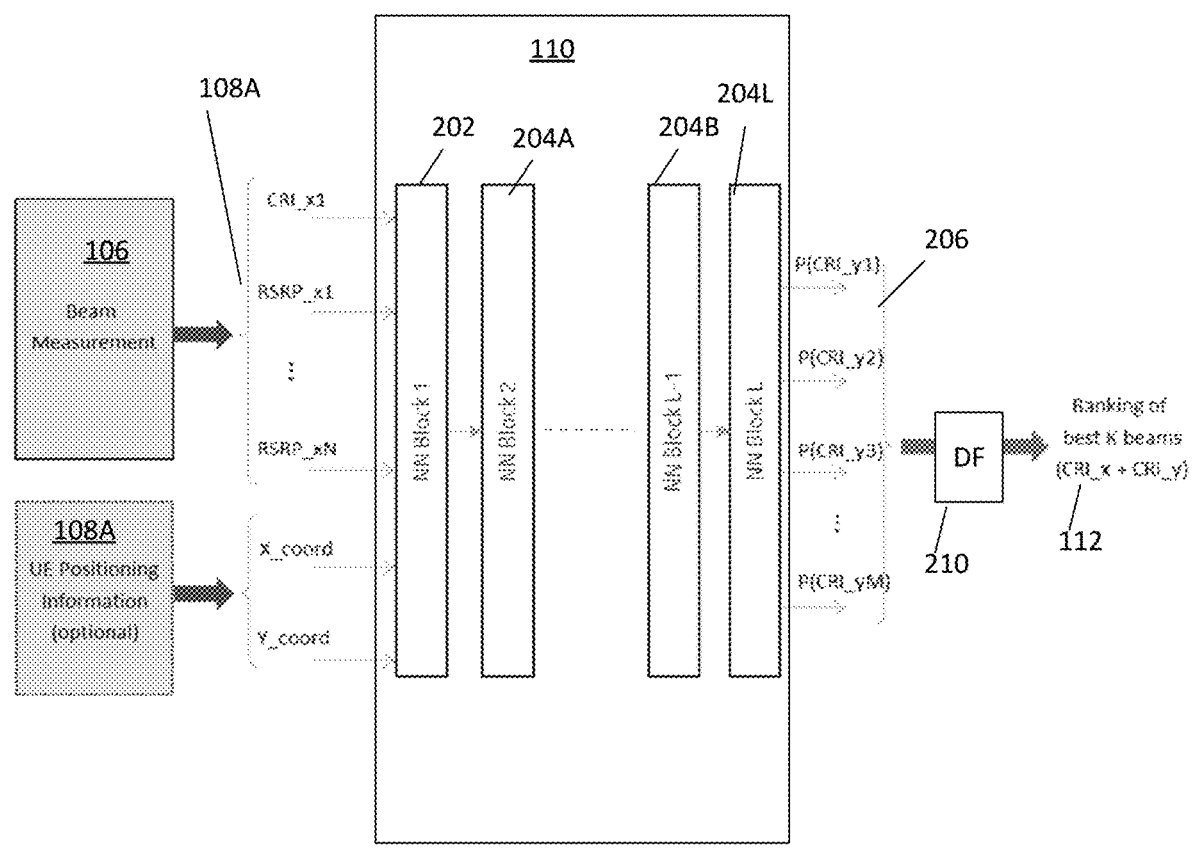
FIG. 2A shows an example of a ML model, in accordance with some example embodiments.
Figure 2B:
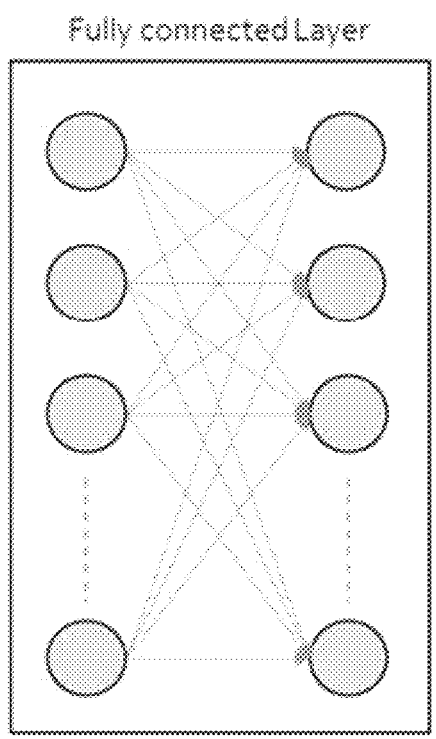
FIG. 2B depicts an example of a fully connected layer of the ML model, in accordance with some example embodiments.

FIG. 2A shows an example of a ML model 110, in accordance with some example embodiments. In the example of FIG. 2A, a neural network design for spatial beam prediction is depicted. The ML model may include one or more blocks. For example, the first neural network (NN) Block 1 202 may receive as inputs certain beam measurements. For example, the UE 102 may, as noted, perform measurements on certain beams, such as the beams xi (e.g., x1, x2, and x3). These measurements may include for example both CRI (CSI-RS resource indicator) and RSRP measurements on the beams $x_i$ (i=1, . . . , N) 108A, although other types of measurements on the beam may be used as inputs well. The CSI-RS resources and UE positioning information (if available) 108B may be optionally provided as an input to NN Block 1. Next, there may be one or more additional so-called "internal" NN blocks 204A, B, and L. For example, each internal NN block (2, ..., L-1) may have $n_h$ neurons (e.g., the number of neurons), such that the NN Block L 204L includes M output neurons corresponding to the predicted (or inferred) CRIs 206 that are the predicted resources and measurement resources (e.g., yj (j=1, ..., M) resources). And for example, the NN Block may be configured as a fully connected layers (FNN), activation function layers, and batch normalization layers. FIG. 2B depicts an example of a fully connected layer. In the example of FIG. 2B, the information moves in the forward direction only from the input to the output blocks, although other data flows may be implemented given a different ML model type.

At the lth NN block of FIG. 2A, the output vector $y^l$ is calculated with a non-linear activation function σ and can be expressed as $y^l=\sigma(W_l^c y^{l-1}+w_l^b)$, where $y^{l-}$ is the output at the previous NN block, $W_l^c$ are the weights of the lth NN block and $w_l^b$ are the biases of the lth NN block. The weights, $W_l^c$ and biases $w_l^b$ forms the trainable parameters $W_l$ of the lth NN block. The last output $y^L$ corresponds to the output of the last NN block of the ML model and can be expressed using non-linear functions $g_{W_l}^{(L)}, \ldots, g_{W_l}^{(l)}$, for l=1, ..., L as a combination of the ML model input and trainable parameters of different NN blocks:

$$y^L = g_{W_L}^{(L)}(g_{W_L}^{(L-1)}(\ldots g_{W_1}^{(1)}(x))).$$

The outputs 206 of the ML model 110 (NN) may be represented by $y^L$, which can be passed to a decision function 210 (e.g., a SoftMax function), such as $P_y$=softmax ($y^L$), to obtain the probability distribution $P_y$ over the set of ML model outputs. These probabilities may be ranked in, for example descending order (although they may be ranked in other ways such as ascending) and then the best K beams may be selected from the ranking as follows:

$$f = \arg{}_m \text{sort} P_y$$

$$\mathcal{L} = \{f_k | k=1, \ldots, K\}$$

where the set $\mathcal{L}$ includes the best K CRI resources as shown at 112, for example.

The ML model 110 may be trained with a stochastic gradient descent (SGD) algorithm that computes a minimum of the loss function in a direction of the gradient with respect to the ML model weights $W_l$, although other training techniques may be used as well. Given $n_l$ data samples from the training set formed by input data $\{X^{(1)}, X^{(2)}, \ldots, X^{(n_l)}\}$ and corresponding labels $y^{(i)}$. The SGD firstly computes gradient estimate $$\hat{g} \leftarrow +\frac{1}{m} \nabla_W \sum_i \text{Loss}(f(X^{(i)}; W_l^{t-1}), y^{(i)}),$$

then updates the weights $W_l^t \leftarrow W_l^{t-1} - \eta \hat{g}$ (where η is the learning rate). SGD iterates these two steps until a stopping criterion is met.

Figure 2C:
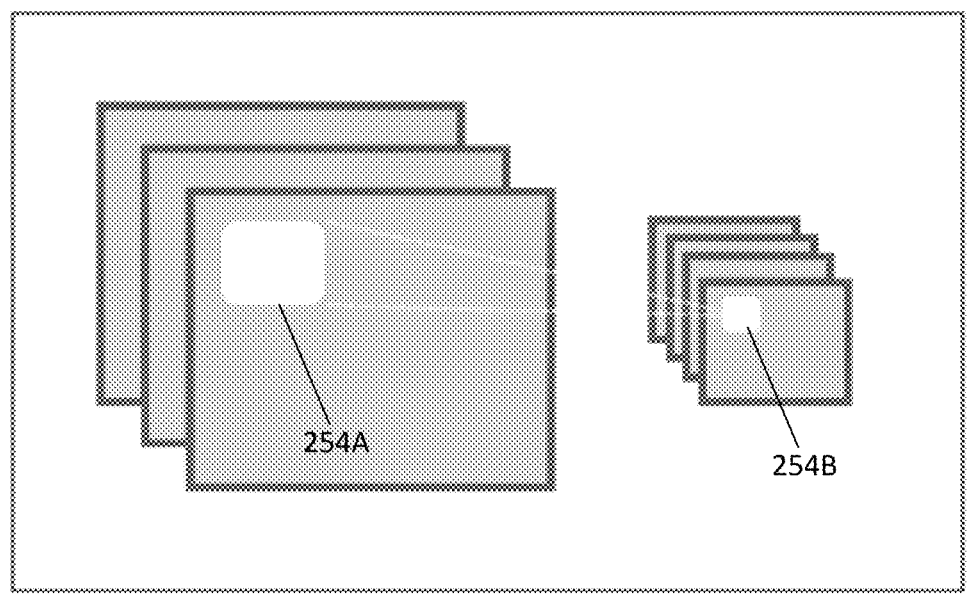
FIG. 2C depicts an example of a two-dimensional convolutional neural network, in accordance with some example embodiments.
Figure 2D:
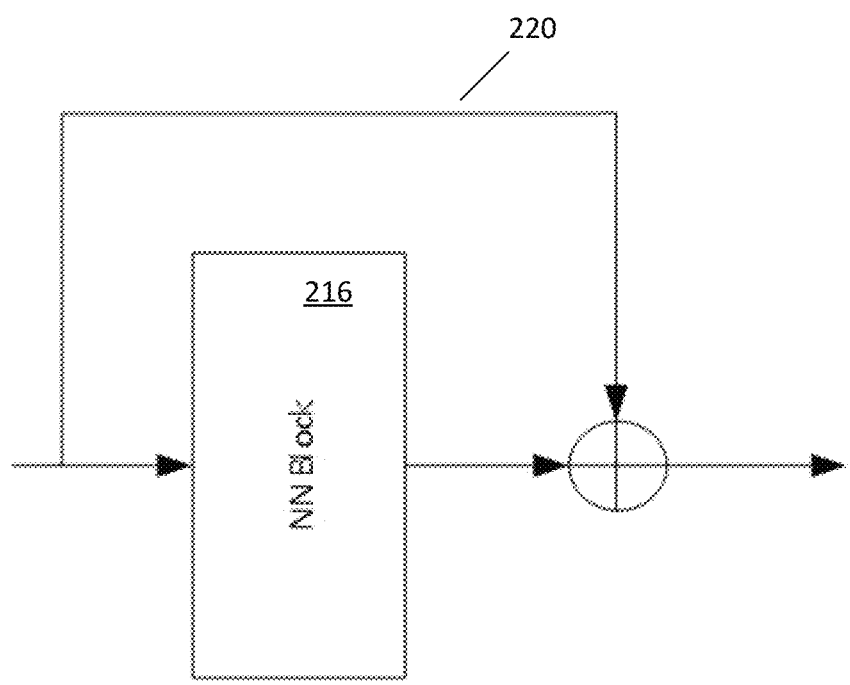
FIG. 2D depicts an example of a residual block (RB) structure, in accordance with some example embodiments.

The NN blocks 202, 204A-L depicted at FIG. 2A may be implemented using different types of neural networks. For example, given different input and output data shapes, each NN block may be implemented as a single dimension (1D) or multi-dimensional (2D or 3D) convolutional layers as found in a convulsion neural network (CNN). In the case of a 2D CNN (an example of which is depicted at FIG. 2C), the neurons of the CNN learn 2D filters that extract characteristics of a limited region 254A within the input data of the block and maps them into a narrower area 254B at the output of the block. Given different NN block numbers, the NN design for the spatial beam prediction model may include one or more residual block (RB) structures for some particular NN blocks. An example of the RB structure is shown in FIG. 2D, where given a NN block 216 (e.g., a stacked CNN), a connection 220 is added between input and output to guarantee residual learning during the training process to facilitate the learning with many NN layers.

Enhancements with respect to beam management based on AI/ML may, as noted, be used for the air-interface in NR (or 5G) and beyond to 6G and so forth. With the NR beam management procedures, extra overhead and latency may be associated with the beam management and reporting process. In general, the base station (e.g., gNB, transmit receive points (TRPs), etc.) may need to transmit a large number of reference signals like SSBs and CSI-RSs towards the UE. This large number or quantity of reference signals will likely cause overhead issues as each beam is associated to a different SSB or CSI-RS resource. Moreover, the NR beam management mechanism may incur a large latency given the time required for the gNB and UE to complete the beam sweeping and refinement(s) to establish the best beam pair (e.g., Tx and Rx pair), which often requires multiple rounds of measurements.

In some of the examples disclosed herein, the UE may be configured to perform beam prediction in the spatial domain by using at least in part a ML (or AI) model, for example. Moreover, this UE may predict a set of beam measurements on at least a portion of the channel measurement resources and report back to the network (as part of a CSI measurement reporting) the ranking of one or more of the best beams determined based on at least on the prediction (as well as actual measurements on the remaining portion of the channel measurement resources). Furthermore, the ML (or AI) model's training, validation, and/or testing procedures may occur during a phase that is separate from the ML (or AI) model's inferencing stage when it makes predictions.

In some example embodiments, a network node, such as a gNB, may configure a UE to associate at least two resource groups (e.g., channel measurement resource groups) to a CSI reporting configuration. And, the CSI reporting configuration may be applied to the reporting of at least one parameter of a predicted (or inferred) outcome of beam prediction.

In some example embodiments, the UE may receive from the network (e.g., gNB) a configuration (or information) for measurement reporting, such as via a CSI reporting configuration, that defines the use of at least two resource groups. This configuration may be received by the UE within the same CSI reporting configuration provided by the network or separately in another reporting configuration message. Each of the resource groups may be associated with (e.g., refer, map, and/or link) a set of measurement resources (set of beams to perform actual measurements) or a set of prediction resources (set of beams to consider in the predictions). For example, the UE may receive a reporting configuration for two sets of measurement resources, such as channel measurement resource set 1 and channel measurement resource set 2. And, the UE may also be configured with respect to how to associate the sets of measurement resources, such that the UE knows the set of resources for actual measurements (e.g., beams x1, x2, and x3 of FIG. 1) and the set of resources for prediction (e.g., beams y1, y2, and y3 of FIG. 1). Given these two resource groups, the association of the two sets may be determined based on one or more of the following "options" explained further below.

Figure 3A:
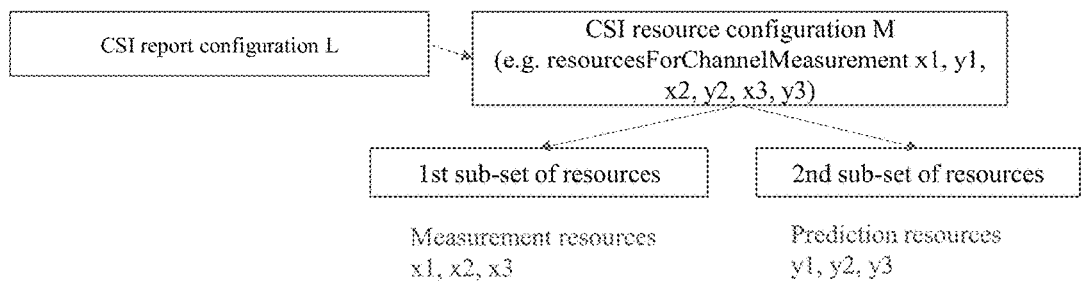
FIGS. 3A-3C depict examples of report configurations and corresponding resource configurations, in accordance with some example embodiments.
Figure 3A:
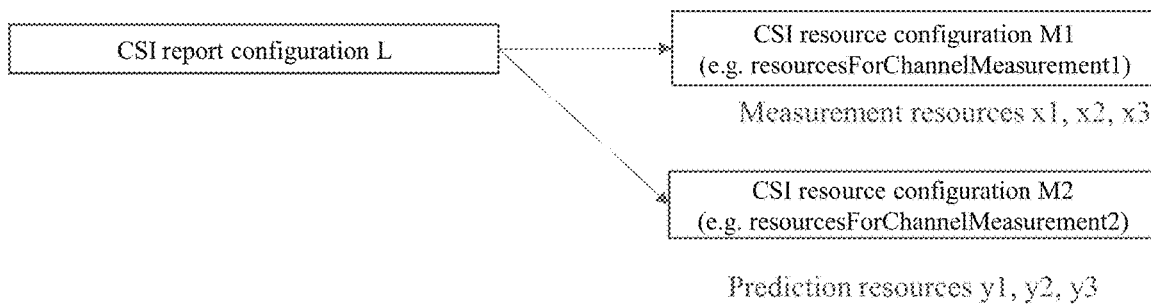

In some example embodiments, the two resource groups may be linked to a single (e.g., the same) CSI resource configuration (e.g. channel measurement resources defined by resourcesForChannelMeasurement) in a single CSI report configuration provided by the network (e.g., gNB) to the UE. A first group (e.g., set or subset) of the channel measurement resources within the CSI resource configuration may be defined as the set of measurement resources and the remaining resources may be considered as the set of prediction resources. In the example of FIG. 3A at Option 1, a CSI report configuration L (which is provided to the UE 102 via RRC, for example) may be linked to (e.g., associated with, define, map to, etc.) a single CSI resource configuration, which in this example is M which includes channel measurement resources x1, x2, and x3 and y1, y2, and y3. In this example, the first group of the resources is defined (e.g., by the resource configuration M) as the actual measurement resources (e.g., beams x1, x2, and x3 on which the UE performs actual channel measurements) while the remaining resources form the second subset (e.g., y1, y2, and y3) that are inferred or predicted resources by the ML model 110, for example. The resources may comprise references which can be used for channel measurements, and examples of the resources include Synchronization Signal Block (SSB), Channel State Information Reference Signals (CSI-RS), Sounding Reference Signals (SRS), Phase Tracking Reference Signals (PTRS), Demodulation Reference Signal (DMRS), and/or other signals which can be used to characterize a channel.

In some example embodiments, the two resource groups can be defined as two CSI resource configurations (e.g., M1 resources for channel measurement, resourcesForChannelMeasurement_1 and M2 resourcesForChannelMeasurement_2) in a single CSI reporting configuration L provided by the network (e.g., gNB) to the UE. The first CSI resource configuration M1 may be defined (e.g., by the resource configuration M1) as the set of measurement resources and the other CSI resource configuration M2 may be defined (e.g., by the resource configuration M2) as the set of prediction resources. In the example of FIG. 3A at Option 2, a CSI report configuration L (which is provided to the UE) may be linked to two separate CSI resource configurations, M1 and M2. A first CSI resource configuration M1 defines the actual measurement resources (e.g., x1, x2, and x3) while the second CSI resource configuration M2 defines the inferred or predicted resources for the UE (e.g., y1, y2, and y3).

Figure 3B:
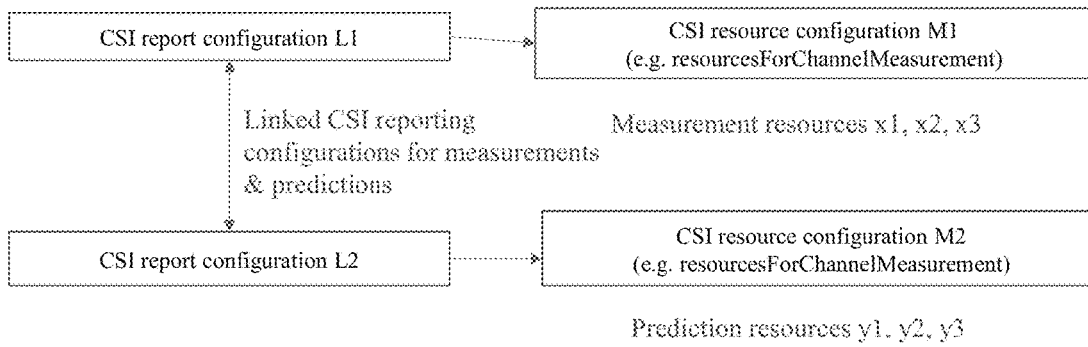
Figure 3B:
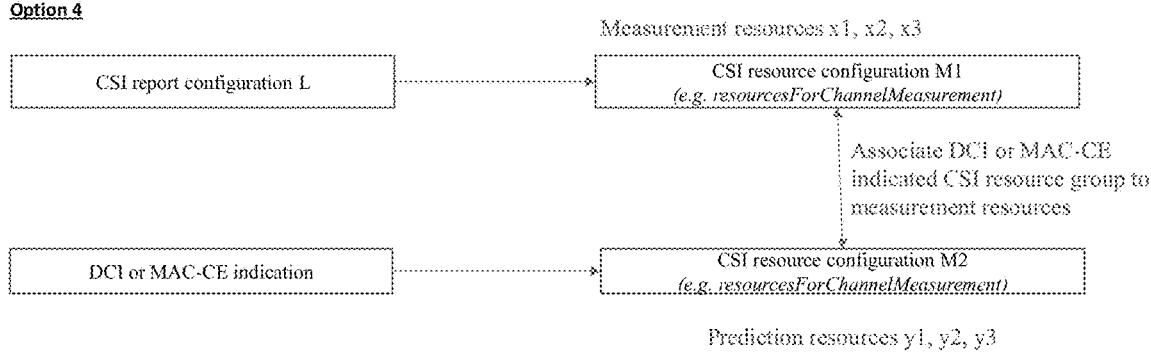
Figure 3B:
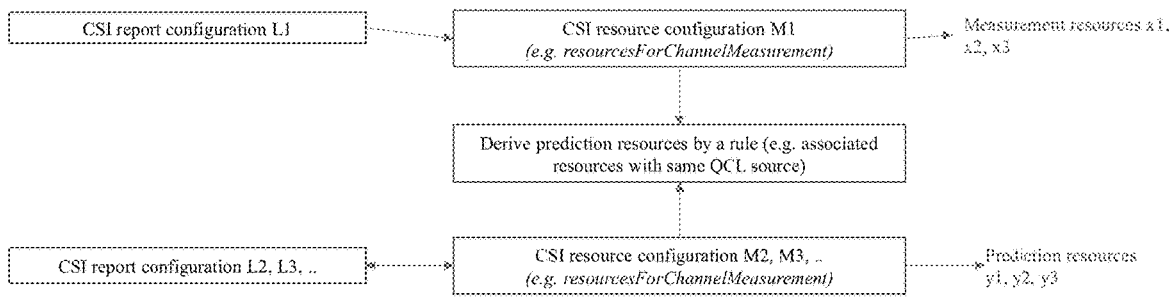

In some example embodiments, two resource groups can be defined as two CSI resource configurations (e.g. resources for channel measurement, resourcesForChannelMeasurement) using two CSI reporting configurations provided by the network (e.g., gNB) to the UE. The two CSI reporting configurations include a first CSI reporting configuration (which is the reporting configuration applied for beam prediction) and a second CSI reporting configuration is determined via pre-configured (or linked) CSI reporting configurations. For example, the first CSI resource configuration of the first CSI reporting configuration may be defined as the set of measurement resources and the second CSI resource configuration in the second CSI reporting configuration may be defined as the set of prediction resources. In the example of FIG. 3B at Option 3, the two CSI report configurations L1 and L2 are each provided by the network (e.g., gNB) to the UE. The first CSI reporting configuration L1 is associated with a first CSI resource configuration M1, which in this example defines the actual measurement resources (e.g., x1, x2, and x3) at the UE. The second CSI reporting configuration L2 is associated with a second CSI resource configuration M2, which in this example defines the ML/AI inferred or predicted resources for the UE (e.g., y1, y2, and y3). Moreover, the CSI report configurations may be linked (or pre-configured as a group) to provide the at least two subsets. For example, the CSI report configuration, L1, may include an indicator (e.g., a flag, value, identifier, or value) within the configuration, and if the CSI report configuration, L2, includes the same indicator, the CSI report configurations are linked for purposes of ML/AI prediction of spatial beams (although L1 and L2 may be linked in other ways as well).

In some example embodiments, one of two resource groups (e.g., channel measurement resources or channel prediction resources) may be determined or derived based on the CSI resource configuration (e.g. resources for channel measurement, resourcesForChannelMeasurement) in the CSI reporting configuration but the other resource group may be further indicated by dynamic signaling. In the example of FIG. 3B at Option 4, a first of the CSI resource configuration M1 (which in this example is associated with measurement resources x-x3) determined or derived from the CSI report configuration L provided to the UE by the network. But the second CSI resource configuration M2 (e.g., associated with predicted resources y1-y3) may be signaled dynamically via the Media Access Control-Control Element (MAC-CE) or DCI (downlink control information) between the network and UE. In the example of FIG. 3B at Option 4, the MAC-CE or DCI may instead be used to dynamically signal the measurement resources x1-x2, while the CSI report configuration message may be used to indicate to the UE the predicted resources y1-y3.

In some example embodiments, one of two resource groups may be derived based on the CSI resource configuration (e.g. channel measurement resources defined by resourcesForChannelMeasurement) provided by the network to the UE in the CSI reporting configuration while the other resource group may not be provided in the CSI reporting configuration but implicitly determined based on a rule. This rule may define the selection of a group (e.g., set or subset) or the other resources configured for the UE across multiple CSI-RS channel measurement resource configurations. In the example of FIG. 3B at Option 5, a first CSI resource group (e.g., measurement resources x1, x2, and x3) is derived based on the CSI resource configuration M1, while the second resource group (e.g., predicted resources y1, y2, and y3) may be implicitly determined based on a rule (e.g., a rule that defines the selection of the subset or other resources configured for the UE across multiple CSI-RS resource configurations). To illustrate further, the L2 and L3 are configured CSI reporting configuration that are at the UE but CSI reporting for beam prediction is done according to the configuration L1. As L2, L3 also define RSs within the CSI resource configurations M2/M3, the UE may derive some resources (e.g., as prediction resources) so they are not measured according to the L1 reporting configuration.

Figure 3C:
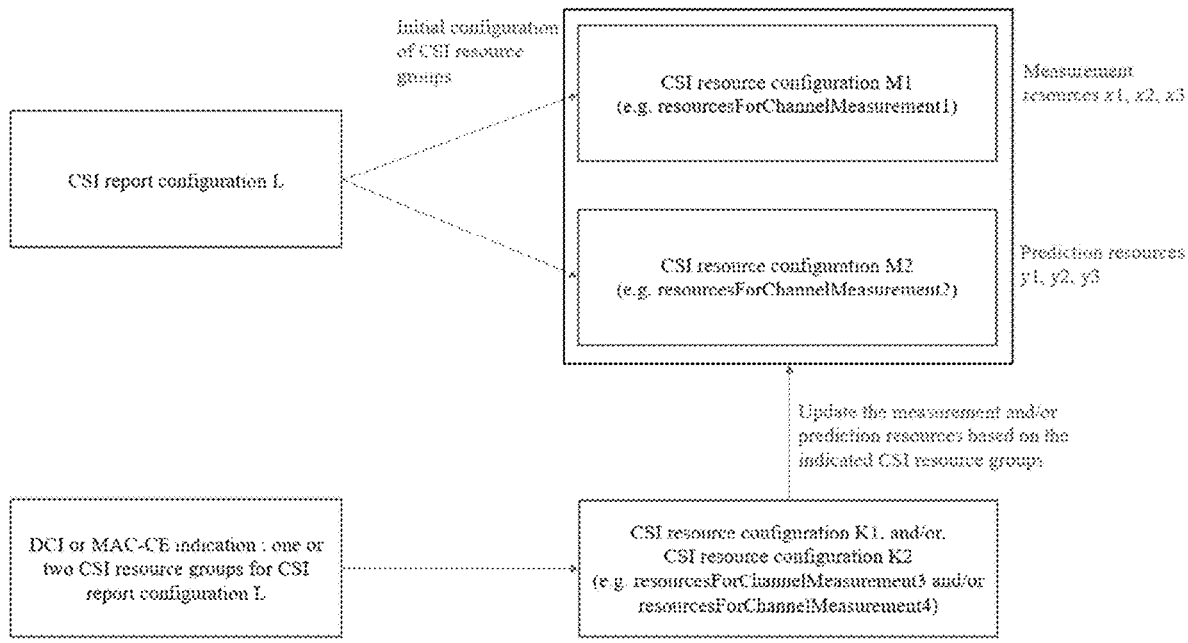

When there are more than two channel measurement resource groups, the association of resource groups to a set of measurement resources and/or a set of prediction resources may change over time with semi-static or dynamic signaling, in accordance with some example embodiments. Referring to the example of FIG. 3C at Option 6, the CSI reporting configuration L configures a first group of channel measurement resources M1 and a second group of channel measurement resources M2. In this example, M1 configures the channel measurement resources for actual measurement, such as x1-x3, while M2 configures channel measurements for prediction, such as y1-y3, although M1 may alternatively be associated with predicted measurement resources and M2 with actual measurement resources. In this example, the UE receives an indication via dynamic signaling (e.g., DCI or MAC), such that the indication provides an update (e.g., K1 and/or K2) for the first group and/or the second group. In response, the UE then updates the corresponding group.

Based on the association defined in one or more of the Options 1-5 noted above, the UE may perform measurements with respect to the resources (e.g., channel measurement resources such as CSI-RS or SSB) of a resource group associated with the beam measurements, in accordance with some example embodiments. And, the UE may use those measurements to predict a ranking of the best beams, in accordance with some example embodiments. Based on the measurement of resources and/or prediction of the best beams, the UE may report the ranking of the best beams to the network.

In some example embodiments, the UE's reporting to the network may be as follows. In a first case (e.g., case 1), the UE (e.g., the ML model 110 and/or other processing functionality) may provide a ranking (e.g., the best K beams) to the network as part of measurement reporting to the network. This ranking may be based on (1) the set of prediction resources (CSI-RS/SSB resources within the set of prediction resources, such as y1-y3) and the set of measurement resources (CSI-RS/SSB resources within the set of actual measurement resources, such as x1-x3). The UE may report at least a CRI (CSI-RS resource indicator) ranking or the SSBRI (SSB resource indicator) ranking for both sets of resources in increasing or decreasing order (e.g., the ranking order may be pre-defined and/or configured by the network) for the associated CSI reporting configuration. The CRI or SSBRI (SS/PBCH Block Resource Indicator) may uniquely indicate a resource (i.e. CRI/SSBRI numbering defined across both resource sets) within both sets of measurement and prediction resources. The CRI or SSBRI indexing for a group of resources (prediction/measurement set) may be pre-defined to the UE, such that the indexing can consider both sets of resources. For example, the UE may start CRI indexing from measurement subset of resources and continue the indexing for the prediction subset of resources. In the CRI or SSBRI ranking, the UE may be configured to report at least a minimum number of beams, K, associated with the set of measurement resources to be included in the reported best CRIs or SSBRIs. Additionally, or alternatively, the UE may further report RSRP values for the minimum number of K beams (from measured resources) with the CRI or SSBRI ranking.

In some example embodiments, the reporting may be as follows. In a second case (case 2), the ML model may provide a ranking (best K beams) that only (or primarily) considers the set of prediction resources. The UE may report at least CRI (e.g., the CSI RS resource indicator) ranking or SSBRI (SSB resource indicator) ranking for set of prediction resources in increasing or decreasing order (ranking order may be pre-defined) for the associated CSI reporting configuration. Alternatively, or additionally, within the same CSI reporting configuration, the same or different reporting quantities may be configured for the set of prediction resources and the set of measurement resources. For example, the UE may be configured for reporting CRI-RSRP (CSI RS resource indicator with RSRP) or SSBRI-RSRP (SSB resource indicator with RSRP) for set of measurement resources (e.g., x1-x3) and only CRI ranking or SSBRI ranking (without RSRP values) for set of prediction resources (e.g., y1-3).

For CRI or SSBRI numbering, the CRI or SSBRI may uniquely indicate a resource (e.g., CRI/SSBRI numbering defined across both resource sets) within both sets of measurement and prediction resources (e.g., this indexing may be similar to case 1 noted above). Alternatively, or additionally, the CRI or SSBRI may separately indicate a resource (e.g., CRI/SSBRI numbering only defined within one resource set) within a set of measurement and prediction resources. There may be an identifier or arrangement within the CSI report to relate the applicable resource set to reported set of quantities.

Figure 4:
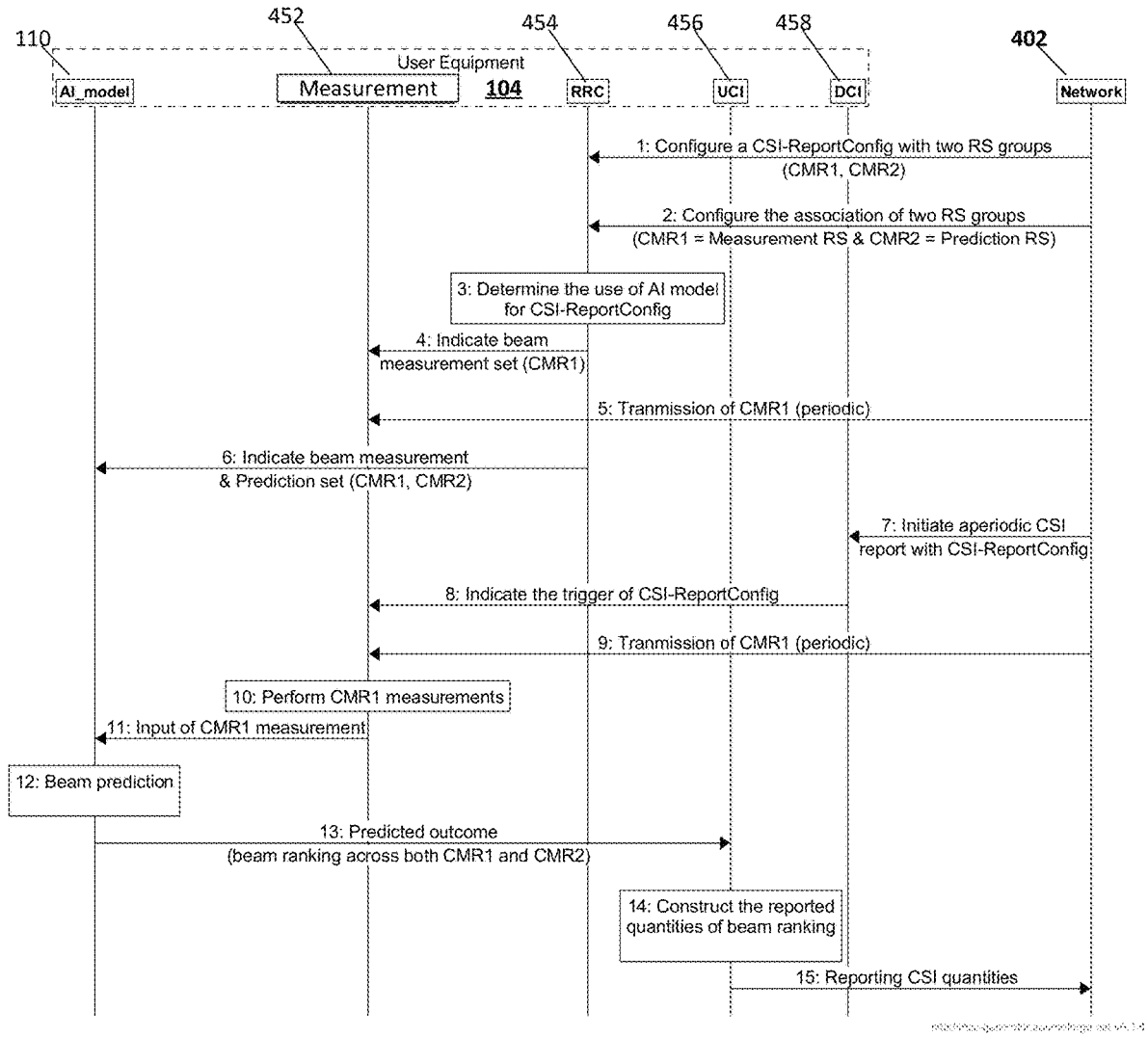
FIG. 4 depict an example of a signaling diagram that provides a framework for beam prediction, in accordance with some example embodiments.

FIG. 4 depicts a process 400 for enabling the use of beam predictions, in accordance with some example embodiments. FIG. 4 depicts the UE 104 and a network 402 (e.g., a gNB 102). The UE may further include a ML model 110 (labeled AI model) and portions of the UE responsible for measurement 452, RRC 454, uplink control information (UCI) 456, and downlink control information (DCI) 458. In the example of FIG. 4, the UE may be configured with a CSI reporting configuration that supports beam prediction, in accordance with some example embodiments. The example of FIG. 4 assumes periodic CSI-RS transmissions (e.g., corresponding to channel measurement resources, CMR1) as the set of measurement resources, and CSI reporting configuration may be associated with aperiodic CSI triggering, which enables to get the beam prediction reporting in a more dynamic manner considering both measurement (CMR1) and prediction resources (CMR2).

At 1, the UE 104 may receive from the network (e.g., gNB 104) a report configuration with two channel measurement groups, in accordance with some example embodiments. For example, the UE may receive, via RRC signal, a CSI report configuration from the network. Among other things, the CSI report configuration message may indicate or define two reference signal groups (e.g., two groups of channel measurement resources). These reference signals may include Channel State Information Reference Signal (CSI-RS), although other types of reference signals may be used as well. The UE may receive the CSI report configuration message via RRC from the network 402. Moreover, the CSI-ReportConfig may define which of the RS groups corresponds to CMR1 and CMR2. At 2, the UE may also receive (via RRC) an association of the RS groups (1) to the actual channel measurement resource group (which in this example is CMR1 measurement resources, such as x1, x2, and x3) and (2) to the predicted channel measurement resource group (which in this example is CMR2 ML/AI predicted channel measurement resources, such as y1, y2, and y3). In some example embodiments, the report configurations and channel measurement resource groups (e.g., for measurement and predicted resources) may be provided and/or determined by the UE in accordance with one or more of the Options 1-5 described above with respect to FIGS. 3A-3B, for example.

At 3-6, the UE 104 may determine that the AI/ML model and RS measurements are associated with the CSI-ReportConfiguration, and may indicate the relevant parameters (e.g., channel measurement resources, CMR1, are for measurements and for use as inputs to the AI/ML model). Moreover, the UE may receive CSI-RS transmissions (or SSBs) as in Step 5, corresponding to the CMR1 in a periodic manner.

At 7-9, the gNB 402 may trigger beam prediction via triggering the A-CSI reporting in the DCI corresponding to the CSI-ReportConfiguration, and the UE may receive the periodic CSI-RS (or SSBs) transmissions associated with CMR1.

At 10-11, the UE 104 may measure the L1-RSRP or other CSI quantities based on the received periodic CSI-RS (or SSBs), and the measurements may be used as an input for the AI/ML model 110.

At 12, the UE 104 uses the AI/ML model 110 (which received as inputs at least beam measurements corresponding to CMR1 such as measurements on x1, x2, and x3) to determine an output corresponding to the predicted channel measurements corresponding to CMRs such as measurements on y1-y3). Additional processing may be used to rank the measurements to determine the K best beams. Although alternatively, or additionally, the AI/ML model may be trained to perform the ranking as well. The K best beams represents a prediction of the best beam ranking over both CMR1 and CMR2 resources (actual channel measurements on x1-x3 and predicted channel measurements on y1 and y3). As noted above, the AI/ML model may also use as an input position information 108B for the UE.

At 13-15, the output 112 of the AI/ML model 110 is ranked to indicate the best beams to be used by the UE 104 to construct the reporting CSI feedback information (as uplink control information, UCI) according to the reporting quantities configured in the CSI-ReportConfig. This reporting by the UE 104 to the network 402 (e.g., gNB) may be performed based on cases 1 and 2 for example, as noted above.

In addition to the above example, there may be other ways of implementing the signaling based on different combinations of NR CSI reporting framework, where periodic, aperiodic, semi-persistent CSI-RS transmissions can be applied for measurement resources and periodic, aperiodic, semi-persistent CSI reporting can be applied for reporting of the predicted ranking of best beams.

Figure 5:
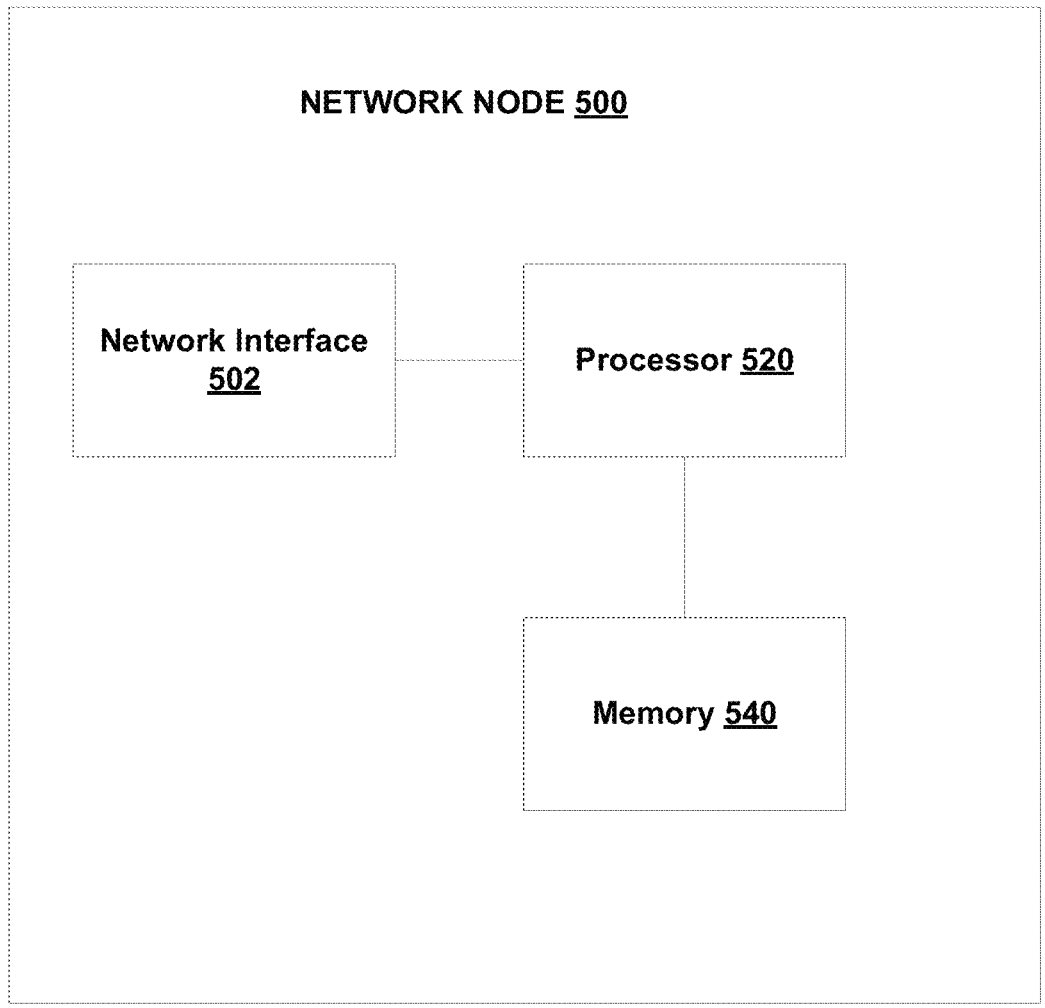
FIG. 5 depicts an example of a network node, in accordance with some example embodiments.

FIG. 5 depicts a block diagram of a network node 500, in accordance with some example embodiments. The network node 500 may comprise or be comprised in one or more network side nodes or functions (e.g., gNB, eNB, DU, TRPs, and/or the like).

The network node 500 may include a network interface 502, a processor 520, and a memory 504, in accordance with some example embodiments. The network interface 502 may include wired and/or wireless transceivers to enable access other nodes including base stations, other network nodes, the Internet, other networks, and/or other nodes. The memory 504 may comprise volatile and/or non-volatile memory including program code, which when executed by at least one processor 520 provides, among other things, the processes disclosed herein with respect to the gNB, for example. For example, the network node may be configured to provide send, to a user equipment, at least a reporting configuration, wherein the reporting configuration is associated with at least a first group of channel measurement resources to be measured by the user equipment and a second group of channel measurement resources for which beam indexes or beam measurements are predicted by a machine learning model comprised at the user equipment; send, to the user equipment, a message to cause the user equipment to initiate channel state information reporting; and in response to the sending of the message, receive channel measurement reporting containing at least an index representing a channel measurement resource of the second group of channel measurement resources that are predicted by the machine learning model comprised at the user equipment.

Figure 6:
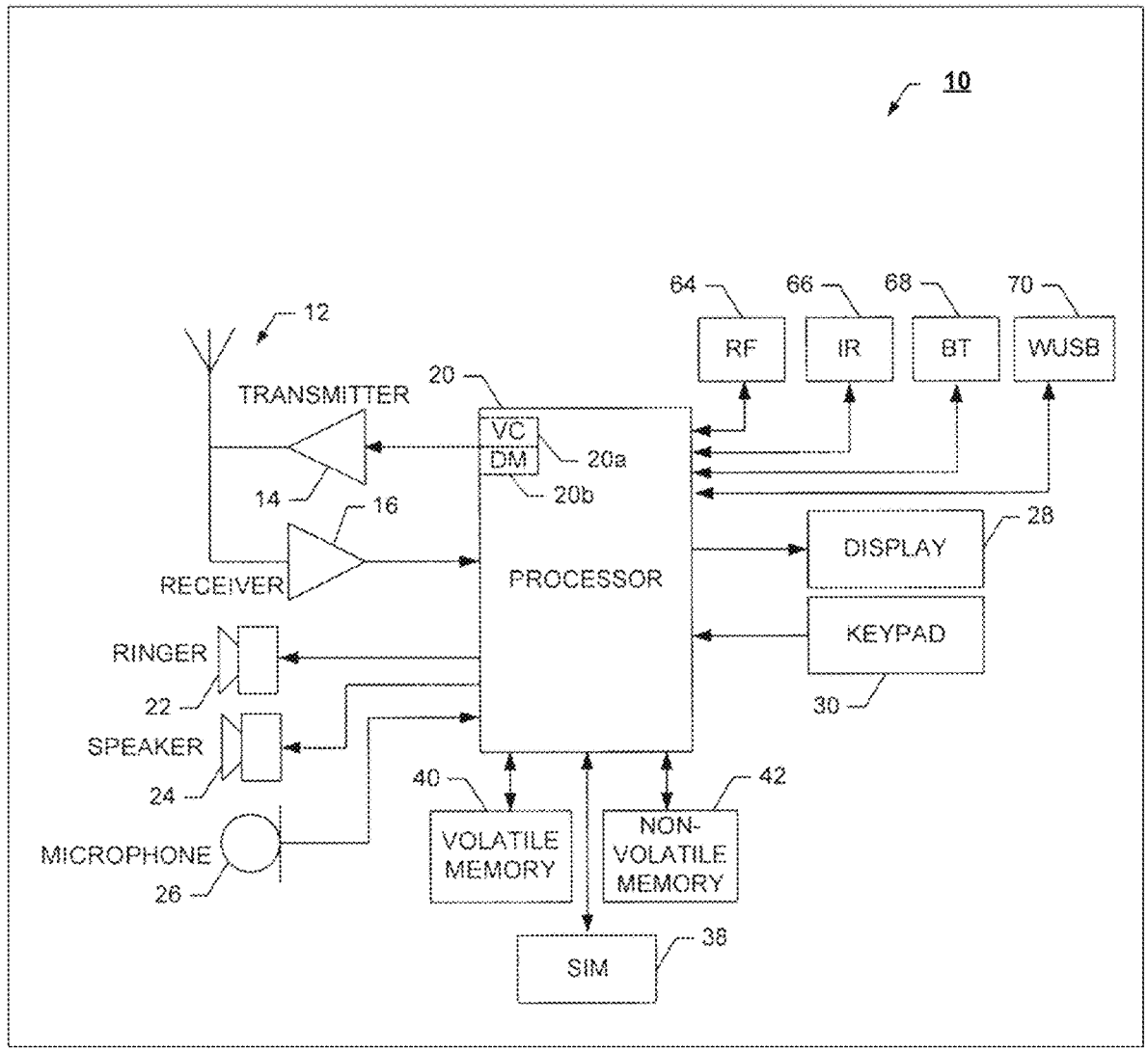
FIG. 6 depicts an example of an apparatus, in accordance with some example embodiments.

FIG. 6 illustrates a block diagram of an apparatus 10, in accordance with some example embodiments. The apparatus 10 may comprise or be comprised in a user equipment, such as user equipment 204. In general, the various embodiments of the user equipment 204 can include cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions, in addition for vehicles such as autos and/or truck and aerial vehicles such as manned or unmanned aerial vehicle and as well as portable units or terminals that incorporate combinations of such functions. The user equipment may comprise or be comprised in an IoT device, an Industrial IoT (IIoT) device, and/or the like. In the case of an IoT device or IToT device, the UE may be configured to operate with less resources (in terms of for example power, processing speed, memory, and the like) when compared to a smartphone, for example.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 6 as a single processor, in some example embodiments the processor 20 may comprise a plurality of processors or processing cores.

The apparatus 10 may be capable of operating with one or more air interface standards, communication protocols, modulation types, access types, and/or the like. Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, sixth-generation (6G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 6, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, U-SIM, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein.

The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to the provide operations disclosed herein with respect to the UE (e.g., one or more of the processes, calculations, and the like disclosed herein including receiving, by a user equipment, at least a reporting configuration from a network, wherein the reporting configuration is associated with at least a first group of channel measurement resources to be measured by the user equipment and a second group of channel measurement resources for which beam indexes or beam measurements are predicted by a machine learning model comprised at the user equipment; providing, as an input to the machine learning model comprised at the user equipment, at least a first set of measurements on the first group of channel measurement resources; and reporting, to the network, channel measurement information, wherein the channel measurement information contains at least an index representing a channel measurement resource of the second group of channel measurement resources that are predicted by the machine learning model comprised at the user equipment.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiments, the application logic, software or an instruction set is maintained on any one of various conventional computer-readable media. In the context of this document, a "computer-readable storage medium" may be any non-transitory media that can contain, store, communicate, propagate or transport the instructions for use by or in connection with an instruction execution system, apparatus, or device, such as a computer or data processor circuitry; computer-readable medium may comprise a non-transitory computer-readable storage medium that may be any media that can contain or store the instructions for use by or in connection with an instruction execution system, apparatus, or device, such as a computer.

Figure 7A:
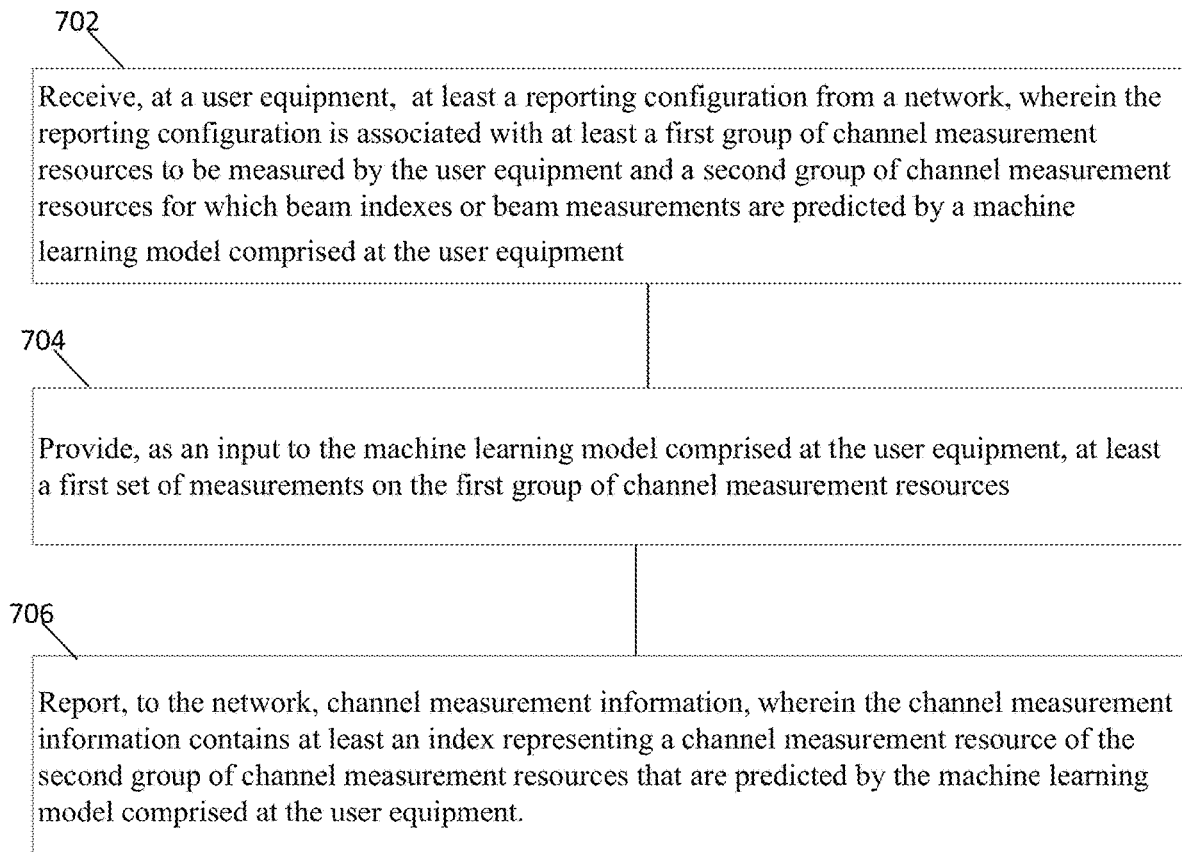
FIGS. 7A and 7B depict example processes for configuring and reporting in a framework where machine learning based beam prediction in the spatial domain is supported, in accordance with some example embodiments.

FIG. 7A depicts an example of a configuration and reporting process, in accordance with some example embodiments.

At 702, the user equipment may, in accordance with some example embodiments, receive at least a reporting configuration from a network, wherein the reporting configuration is associated with at least a first group of channel measurement resources to be measured by the user equipment and a second group of channel measurement resources for which beam indexes or measurements are predicted by a machine learning model comprised at the user equipment. For example, the UE 104 may receive reporting configurations from the gNB (or network 402) as noted above with respect to 1 and 2 at FIG. 4. The reporting configuration may be associated with (e.g., mapped, defined, determined, or derived) resource configurations, such as CSI channel measurement resources, some of which may be used for actual measurements on beams (e.g., beams x1-x3) while other may be predicted by a ML model (e.g., beam indexes or measurements beams for y1-y3). Options 1-5 provide examples of the reporting configurations and the associations to the measurement resources.

At 704, at least a first set of measurements on the first group of channel measurement resources may be provided as an input to the machine learning model comprised at the user equipment, in accordance with some example embodiments. For example, a set of measurements performed on beams x1-x3 may be provided to the ML model 110 (see, e.g., 10 and 11 at FIG. 4). The ML model 110 may as noted be trained to provide as an output predicted measurements of, for example, beams y1-y3 based on, among other things, inputs, such as the set of measurements performed on beams x1-x3.

At 706, the UE may report to the network channel measurement information, wherein the channel measurement information contains at least an index representing a channel measurement resource of the second group of channel measurement resources that are predicted by the machine learning model comprised at the user equipment, in accordance with some example embodiments. For example, the MLs 110 may provide an output that includes the predicted CSI values for beams y1-y3. And, the UE may report to the network a beam index along with the corresponding CRI, so in the case of K is 6 best beams being reported to the gNB. The ranking may include at least the a ranking of the predicted CSI values.

In the example of FIG. 7A, the index may be determined using (or based on) a joint indexing of the first group of channel measurement resources measured by the user equipment and the second group of channel measurement resources predicted by the machine learning model. For example, the index may comprise a beam index along with the corresponding CRI, so in the case of K best beams being reported, the UE may rank the beams in descending order (e.g., best to worse), such as CRI_y2, CRI_y1, CRI_y3, CRI_x3, CRI_x2, CRI_y7. Alternatively, or additionally, the index may be determined using (or based on) an indexing of the second group of channel measurement resources for which beam indexes or beam measurements are predicted by the machine learning model. For example, the reported index may comprise a beam index along with the corresponding CRI of only the predicted beams, such as CRI_y2, CRI_y1, CRI_y3, and CRI_y7.

Figure 7B:
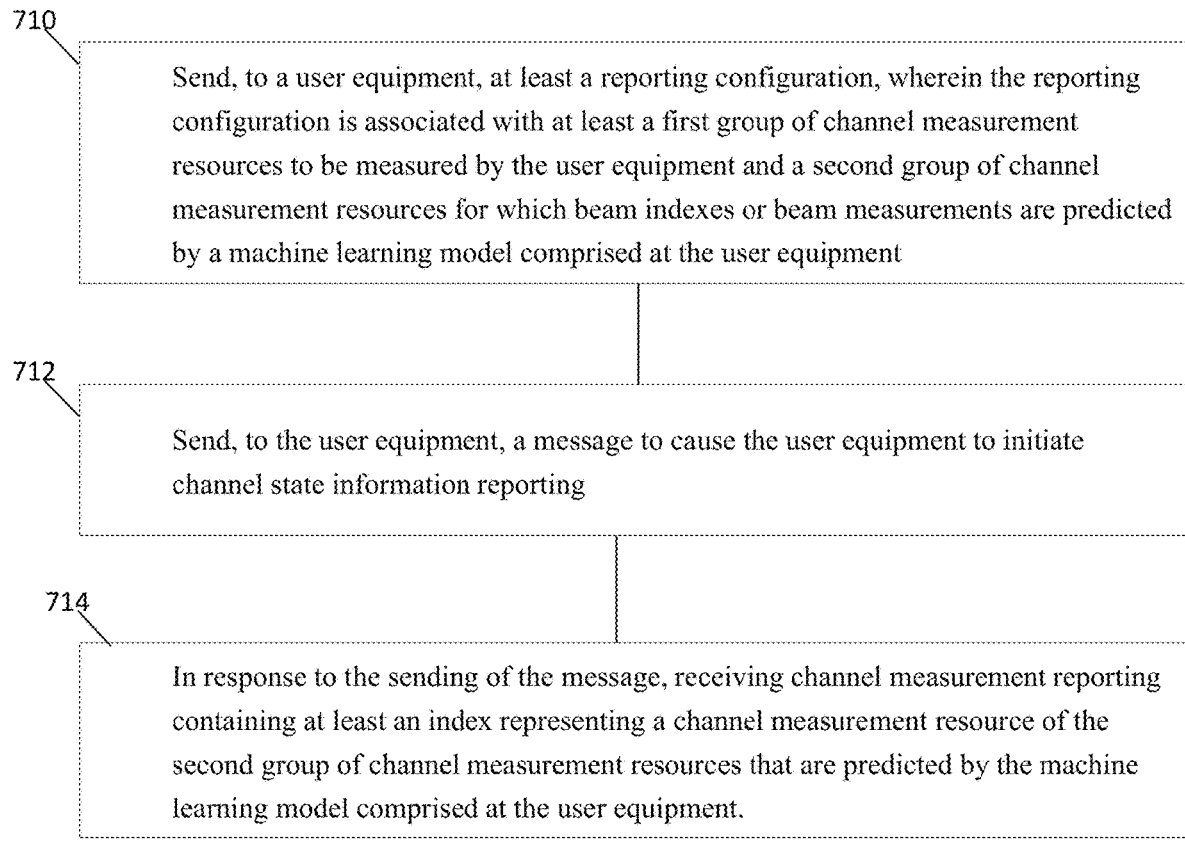

FIG. 7B depicts an example of a configuration and reporting process, in accordance with some example embodiments. At 710, the gNB may send to the user equipment a reporting configuration, such as CSI Reporting Configuration message. The configuration may be associated with at least a first group of channel measurement resources to be measured by the user equipment and a second group of channel measurement resources for which beam indexes or beam measurements are predicted by a machine learning model comprised at the user equipment. At 712, the gNB may send to the user equipment, a message to cause the user equipment to initiate channel state information reporting. For example, the message may be a similar to the message 7 noted above with respect to FIG. 4, although other types of message may be used as well. At 714, in response to the sending of the message at 712, the gNB may receive channel measurement reporting containing at least an index representing a channel measurement resource of the second group of channel measurement resources that are predicted by the machine learning model comprised at the user equipment.

Without in any way limiting the scope, interpretation, or application of the claims appearing below, a technical effect of one or more of the example embodiments disclosed herein may include a framework within the NR for beam prediction in spatial domain as well as the corresponding configuration and reporting.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

resources. Related systems, methods, and articles of manufacture are also disclosed.

What is claimed is:

1. A method comprising:
receiving, by a user equipment, at least a reporting configuration from a network, wherein the reporting configuration is associated with at least a first group of channel measurement resources to be measured by the user equipment and a second group of channel measurement resources for which beam indexes or beam measurements are predicted by a machine learning model comprised at the user equipment;
providing, as an input to the machine learning model comprised at the user equipment, at least a first set of measurements on the first group of channel measurement resources; and
reporting, to the network, channel measurement information, wherein the channel measurement information contains at least an index representing a channel measurement resource of the second group of channel measurement resources that are predicted, using at least the first set of measurements on the first group of channel measurement resources, by the machine learning model comprised at the user equipment.

2. The method of claim 1, wherein the index is determined by considering a joint indexing of the first group of channel measurement resources measured by the user equipment and the second group of channel measurement resources predicted by the machine learning model.

3. The method of claim 1, wherein the index is determined by considering indexing of the second group of channel measurement resources for which beam indexes or beam measurements are predicted by the machine learning model.

4. The method of claim 1, wherein a single resource configuration containing channel measurement resources is mapped to the reporting configuration, wherein the first group of channel measurement resources to be measured by the user equipment is defined as a sub-set of channel measurement resources in the single resource configuration, wherein a remaining portion of channel measurement resources are determined as the second group of channel measurement resources for which beam indexes or beam measurements are predicted by the machine learning model.

5. The method of claim 1, wherein a first resource configuration and a second resource configuration each contain at least channel measurement resources that are mapped to the reporting configuration comprised as a single reporting configuration, wherein the first resource configuration is determined as the first group of channel measurement resources to be measured by the user equipment, and wherein the second resource configuration is determined as the second group of channel measurement resources for which beam indexes or beam measurements are predicted by the machine learning model.

6. The method of claim 1, wherein the reporting configuration is associated to an another reporting configuration, wherein the reporting configuration is linked to the other reporting configuration, such that each of the reporting configuration and the other reporting configuration is mapped to a corresponding one of the first group of channel measurement resources or the second group of channel measurement resources.

7. The method of claim 1, wherein the reporting configuration defines either the first group of channel measurement resources or the second group of channel measurement resources, wherein the method further comprises:
receiving an indication by a dynamic signaling from the network, wherein the indication provides the other of the two channel measurement resource groups not defined by the reporting configuration; and
applying the indicated other of the two channel measurement resource groups resource group as a remaining resource group that is associated with the reporting configuration.

8. The method of claim 1, wherein the reporting configuration configures the first group of channel measurement resources and the second group of channel measurement resources, wherein the method further comprises:

receiving an indication by a dynamic signaling from the network, wherein the indication provides at least an update to the first group and/or the second group; and updating the indicated resource group as the first or second resource group for the reporting configuration.

9. The method of claim 1, wherein the reporting configuration is associated with a resource configuration including the first group of channel measurement resources to be measured by the user equipment, and wherein the second group of channel measurement resources, for which beam indexes or beam measurements are predicted by the machine learning model, is derived based on a rule.

10. The method of claim 1, wherein the reporting configuration is associated with a resource configuration including the second group of channel measurement resources for which beam indexes or beam measurements are predicted by the machine learning model, and wherein the first group of channel measurement resources to be measured by the user equipment is derived based on a rule.

11. An apparatus comprising:
at least one processor; and
at least one memory including computer program code, the at least one memory and the computer program code configured to, with the at least one processor, cause the apparatus to at least:
receive at least a reporting configuration from a network, wherein the reporting configuration is associated with at least a first group of channel measurement resources to be measured by the apparatus and a second group of channel measurement resources for which beam indexes or beam measurements are predicted by a machine learning model comprised at the apparatus;
provide, as an input to the machine learning model comprised at the apparatus, at least a first set of measurements on the first group of channel measurement resources; and
report, to the network, channel measurement information, wherein the channel measurement information contains at least an index representing a channel measurement resource of the second group of channel measurement resources that are predicted, using at least the first set of measurements on the first group of channel measurement resources, by the machine learning model comprised at the apparatus.

12. The apparatus of claim 11, wherein the index is determined by considering a joint indexing of the first group of channel measurement resources measured by the apparatus and the second group of channel measurement resources predicted by the machine learning model.

13. The apparatus of claim 11, wherein the index is determined by considering indexing of the second group of channel measurement resources for which beam indexes or beam measurements are predicted by the machine learning model.

14. The apparatus of claim 11, wherein a single resource configuration containing channel measurement resources is mapped to the reporting configuration, wherein the first group of channel measurement resources to be measured by the apparatus is defined as a sub-set of channel measurement resources in the single resource configuration, wherein a remaining portion of channel measurement resources are determined as the second group of channel measurement resources for which beam indexes or beam measurements are predicted by the machine learning model.

15. The apparatus of claim 11, wherein a first resource configuration and a second resource configuration each contain at least channel measurement resources that are mapped to the reporting configuration comprised as a single reporting configuration, wherein the first resource configuration is determined as the first group of channel measurement resources to be measured by the apparatus, and wherein the second resource configuration is determined as the second group of channel measurement resources for which beam indexes or beam measurements are predicted by the machine learning model.

16. The apparatus of claim 11, wherein the reporting configuration is associated to an another reporting configuration, wherein the reporting configuration is linked to the other reporting configuration, such that each of the reporting configuration and the other reporting configuration is mapped to a corresponding one of the first group of channel measurement resources or the second group of channel measurement resources.

17. The apparatus of claim 11, wherein the reporting configuration defines either the first group of channel measurement resources or the second group of channel measurement resources, wherein the apparatus is further caused to at least receive an indication by a dynamic signaling from the network, wherein the indication provides the other of the two channel measurement resource groups not defined by the reporting configuration and apply the indicated other of the two channel measurement resource groups resource group as a remaining resource group that is associated with the reporting configuration.

18. The apparatus of claim 11, wherein the reporting configuration configures the first group of channel measurement resources and the second group of channel measurement resources, wherein the apparatus is further caused to at least receive an indication by a dynamic signaling from the network, wherein the indication provides at least an update to the first group and/or the second group and update the indicated resource group as the first or second resource group for the reporting configuration.

19. The apparatus of claim 11, wherein the reporting configuration is associated with a resource configuration including the first group of channel measurement resources to be measured by the apparatus, and wherein the second group of channel measurement resources, for which beam indexes or beam measurements are predicted by the machine learning model, is derived based on a rule.

20. The apparatus of claim 11, wherein the reporting configuration is associated with a resource configuration including the second group of channel measurement resources for which beam indexes or beam measurements are predicted by the machine learning model, and wherein the first group of channel measurement resources to be measured by the apparatus is derived based on a rule.

* * * * *